(12) United States Patent
Pollmann et al.

(10) Patent No.: US 8,119,049 B1
(45) Date of Patent: Feb. 21, 2012

(54) CONTINUOUS INJECTION MOLDING PROCESSES AND SYSTEMS WITH RETRACTABLE CORE

(75) Inventors: Robert Pollmann, Karlstein/Thaya (AT); Andreas Reger, Birmingham, MI (US); Roland Kuehtreiber, Plainfield, IL (US)

(73) Assignee: Pollmann North America, Inc., Romeoville, IL (US)

( * ) Notice: Subject to any disclaimer, the term of this patent is extended or adjusted under 35 U.S.C. 154(b) by 0 days.

(21) Appl. No.: 12/854,130

(22) Filed: Aug. 10, 2010

(51) Int. Cl.
*B29C 45/14* (2006.01)
*B29C 45/36* (2006.01)
*B29C 70/72* (2006.01)

(52) U.S. Cl. ........... 264/272.14; 264/272.15; 264/328.7; 425/123; 425/125; 425/129.1

(58) Field of Classification Search ............. 264/272.15, 264/275, 278, 279, 328.7, 272.14; 425/116, 425/129.1, 123, 125
See application file for complete search history.

(56) References Cited

U.S. PATENT DOCUMENTS

| | | | |
|---|---|---|---|
| 4,470,786 A | | 9/1984 | Sano |
| 5,049,055 A | * | 9/1991 | Yokoyama .................... 425/116 |
| 5,182,032 A | | 1/1993 | Dickie |
| 5,240,757 A | | 8/1993 | Schad |
| 5,685,884 A | * | 11/1997 | Van Den Berg ................ 29/595 |
| 5,842,265 A | | 12/1998 | Rink |
| 6,129,881 A | | 10/2000 | Puniello |
| 6,251,323 B1 | | 6/2001 | Hoedl |
| 6,379,138 B1 | | 4/2002 | Puniello |
| 6,780,067 B1 | | 8/2004 | Kono |
| 2006/0061010 A1 | | 3/2006 | Huonker |
| 2007/0018354 A1 | | 1/2007 | Bazzo |
| 2010/0052213 A1 | | 3/2010 | Oohashi |

FOREIGN PATENT DOCUMENTS

| | | |
|---|---|---|
| DE | 4011263 | 10/1990 |
| FR | 2556645 | 6/1985 |
| JP | 57128528 | 8/1982 |
| JP | 10-286844 | * 10/1998 |
| WO | 2010050308 | 5/2010 |

\* cited by examiner

*Primary Examiner* — Jill Heitbrink
(74) *Attorney, Agent, or Firm* — McDonnell Boehnen Hulbert & Berghoff LLP (57) ABSTRACT

Injection-molding processes and systems are described herein. An exemplary method involves: (a) holding one or more inserts in a desired position within a mold cavity by contacting a retractable core to at least a portion of each insert, wherein the retractable core is a feature of a mold plate; (b) while the one or more inserts are being held in the desired position by the retractable core, initiating an injection of molten plastic into the mold cavity; (c) retracting the retractable core from the one or more inserts while continuing the injection of molten plastic into the mold cavity, wherein retracting the retractable core creates additional cavity space within the mold cavity between the retractable core and the one or more inserts; and (d) continuing the injection of molten plastic into the mold cavity until the mold cavity, including the additional cavity space, is filled. The retractable core is preferably retracted at a point when molten plastic filling cavity space further from the retractable core has substantially cooled and hardened, while molten plastic filling cavity space in close proximity to the retractable core remains substantially heated.

17 Claims, 8 Drawing Sheets

CONTINUOUS INJECTION MOLDING PROCESSES AND SYSTEMS WITH RETRACTABLE CORE

BACKGROUND

Injection molding is a manufacturing process used to produce plastic products of all sizes. Typically, the process involves heating thermoplastic or thermosetting plastic materials until they are in molten form and injecting the molten plastic into a mold cavity. Inside the mold cavity, the plastic material cools and hardens, taking on the form of the mold cavity.

Injection-molding systems typically include a "material hopper" which holds the raw plastic and feeds the raw plastic into a heated "injection barrel" which turns the plastic into a molten state. The injection barrel includes a plunger, screw, or other means to pressurize and force the molten plastic into the mold through a nozzle located at the end of the injection barrel. The nozzle typically connects to the mold by means of a "sprue", which is a bushing that forms a seal between the nozzle and the mold. Once molten plastic enters the mold, it flows into the mold cavity by means of channels in the mold, which are generally referred to as "runners." A "gate" defines the entrance of each runner into the mold cavity. Various types and sizes of gates may be used depending upon the design of the system.

In some injection-molding systems, non-plastic inserts may be encapsulated within, and molded into, the final plastic product. For example, electrical conductors, such as wires or strips of electrically conductive materials, may be encapsulated within portions of specialized plastic components (e.g., automotive and aircraft plugs and connectors).

Due to the high pressure of molten plastic flowing through the cavity (25-250 tons per square inch), inserts must generally be fixed in their desired positions within the mold cavity; otherwise, the pressurized molten plastic flowing through the cavity will move the inserts in an undesirable manner. In the case of electrical inserts, fixation of the inserts is particularly important. The electrical inserts cannot be allowed to contact each other due to the risk of creating a short circuit. Additionally, in many end-use applications, great care must be taken to ensure that the electrical inserts are fully encapsulated within the plastic part in order to prevent contamination and/or oxidation from air, moisture, or oils.

A multi-shot injection molding process is a common method employed for the manufacture of plastic components with electrical inserts. In a typical two-shot process, the pressurized plastic injection into the mold is performed twice, with an interruption in between the shots. Fixation of inserts during the first of the two injections is traditionally accomplished by means of removable, small diameter hold-down pins. Typically, the small pins are inserted through holes in the mold and into the mold cavity. The pins may be configured to put pressure on the surface of an electrical conductor in order to prevent vertical movement, or the conductor may be enlarged in certain sections and configured with a through-hole in those enlarged sections, such that the pins may be inserted through the conductor to prevent lateral movement of the conductor.

After the first injection is complete, and the mold cavity is filled, the plastic within the mold cavity is allowed to cool and harden. Once the plastic in the mold cavity sufficiently hardens, the pins are removed from the mold cavity, leaving an unfilled opening (i.e., a pinhole) within the mold cavity where each pin was removed. Accordingly, a second injection of molten plastic is required to fill the openings left when the pins are removed.

OVERVIEW

There are drawbacks, however, to the customary two-part injection molding process. In particular, because the plastic from the first injection has cooled when the second injection occurs, "knit lines" form between the plastic from the first injection and the plastic from the second injection. Knit lines, which may also be referred to as "weld lines" or "meld lines", are visible lines that form where two flow fronts of plastic intersect during a molding process. Knit lines occur because the two flow fronts are of substantially differing temperatures, which prevents proper bonding between the flows. The knit lines may serve as an infiltration point for moisture or other contaminants, particularly over time as the plastic component is subject to mechanical and/or thermal stress. As such, knit lines are generally a point of weakness in the plastic, and as a result, may be undesirable.

Accordingly, exemplary embodiments provide for a single, continuous injection molding process in which inserts are held in a desired position within a mold cavity by a retractable core. The retractable core initially holds the inserts in the desired position within the mold cavity, but is removed in the midst of the injection process. In an exemplary method, a gate is located near the retractable core such that a window of time exists during the injection of molten plastic whereby already-injected plastic further from the retractable core (and gate) has substantially cooled and hardened, while already-injected plastic near the retractable core has not. Advantageously, retraction occurs during this window. The hardened plastic further from the gate functions to hold the inserts in place during the period in which the cavity space created by the retracted core is filled with molten plastic, whereby the newly injected molten plastic securely bonds to the still-heated plastic in close proximity to the retractable core. This single-injection molding process may therefore produce a plastic product with embedded inserts and without knit lines.

In one aspect, an exemplary injection-molding process involves: (a) holding one or more inserts in a desired position within a mold cavity by contacting a retractable core to at least a portion of each insert, wherein the retractable core is a feature of a mold plate; (b) while the one or more inserts are being held in the desired position by the retractable core, initiating an injection of molten plastic into the mold cavity; (c) retracting the retractable core from the one or more inserts while continuing the injection of molten plastic into the mold cavity, wherein retracting the retractable core creates additional cavity space within the mold cavity between the retractable core and the one or more inserts; and (d) continuing the injection of molten plastic into the mold cavity until the mold cavity, including the additional cavity space, is filled. The process may further involve waiting for a predetermined cooling time for the injected molten plastic to cool and harden, thereby forming a plastic product having the one or more inserts embedded therein, and after the predetermined cooling time, ejecting the plastic product from the mold cavity.

Preferably, the injection of molten plastic into the mold cavity is accomplished via a runner having at least one gate located in close proximity to the retractable core, such that molten plastic filling cavity space further from the retractable core in the mold cavity cools and hardens while molten plastic filling cavity space within the mold cavity in close proximity to the retractable core remains substantially heated. As such, the step of retracting the retractable core from the one or more inserts while continuing to inject the molten plastic into the cavity is preferably performed when (i) already-injected molten plastic further from the retractable core in the mold cavity has substantially cooled and (ii) already-injected molten plastic near the retractable core in the mold cavity has not substantially cooled, such that the substantially-cooled plastic further from the retractable core holds the one or more inserts in the desired location after retracting the retractable core, and such that molten plastic injected into the additional cavity space between the retractable core and the inserts securely bonds already-injected molten plastic near the retractable core in the mold cavity. Alternatively, the injection through the mold plates may be accomplished using a direct gate, a hot runner, or another means.

In another aspect, an exemplary injection-molding process involves positioning a retractable core within a mold cavity to hold one or more electrically conductive inserts in a desired position within the mold cavity, wherein the retractable core is configured to restrict the movement of a proximal portion of each of the one or more inserts in at least one horizontal direction and one vertical direction, further wherein the mold cavity is defined by a first mold plate and a second mold plate and the retractable core is a feature of the second mold plate. While the one or more inserts are being held in the desired position by the retractable core, initiating an injection of hot molten plastic into the mold cavity through at least one gate located in close proximity to the retractable core, wherein the injected plastic: (i) substantially fills a first cavity space encompassing the gate and the proximal portion of each of the one or more inserts, and (ii) substantially fills a second cavity space encompassing a distal portion of each of the one or more inserts and located beyond the first cavity space in relation to the gate. While the injection of hot molten plastic continues, and at such time that the injected plastic in the second cavity space has cooled and hardened sufficiently to substantially secure the distal portion of each of the one or more inserts from movement and while the injected plastic in the first cavity space is still sufficiently warm and molten to securely bond to newly injected hot molten plastic, retracting the retractable core from its position restricting the movement of a proximal portion of each of the one or more inserts, wherein retracting the retractable core creates an additional cavity space within the mold cavity between the retractable core and the one or more inserts. And additionally, continuing the injection of molten plastic into the mold cavity until the mold cavity, including the additional cavity space, is filled.

In another aspect, an exemplary injection-molding process involves positioning a retractable core within a mold cavity to hold one or more electrically conductive inserts in a desired position within the mold cavity, wherein the retractable core is configured to restrict the movement of a proximal portion of each of the one or more inserts in at least one horizontal direction and one vertical direction, further wherein the mold cavity is defined by a first mold plate and a second mold plate and the retractable core is a feature of the second mold plate. The process further includes securing a distal portion of each of the one or more inserts within a mold cavity feature, such that the distal portion of each of the one or more inserts is restricted from movement. While the one or more inserts are being held in the desired position by the retractable core and the mold cavity feature, initiating an injection of hot molten plastic into the mold cavity through at least one gate, wherein the injected plastic substantially fills the mold cavity, including a first cavity space encompassing the gate and the proximal portion of each of the one or more inserts. While the injection of hot molten plastic continues, and within such time that the injected plastic in the first cavity space is still sufficiently warm and molten to securely bond to newly injected hot molten plastic, retracting the retractable core from its position restricting the movement of a proximal portion of each of the one or more inserts, wherein retracting the retractable core creates an additional cavity space within the mold cavity between the retractable core and the one or more inserts. And additionally, continuing the injection of molten plastic into the mold cavity until the mold cavity, including the additional cavity space, is filled.

In another aspect, an exemplary injection-molding system comprises (a) a first mold plate having an inner surface defining a first portion of a mold cavity; (b) a second mold plate having an inner surface defining a second portion of the mold cavity, wherein the first mold plate mates to the second mold plate to define the mold cavity, wherein the second mold plate comprises a retractable core, wherein the retractable core is extendable from the inner surface of the second mold plate to hold one or more inserts in a desired position within the mold cavity, and wherein the retractable core is retractable, during a continuous injection of molten plastic, to create additional cavity space within the mold cavity between the retractable core and the one or more inserts; and (c) a runner having a gate located in close proximity to the retractable core, such that molten plastic filling cavity space further from the retractable core in the mold cavity will cool and harden while molten plastic filling cavity space within the mold cavity in close proximity to the retractable core remains substantially heated.

These aspects, as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

Figure 1A:
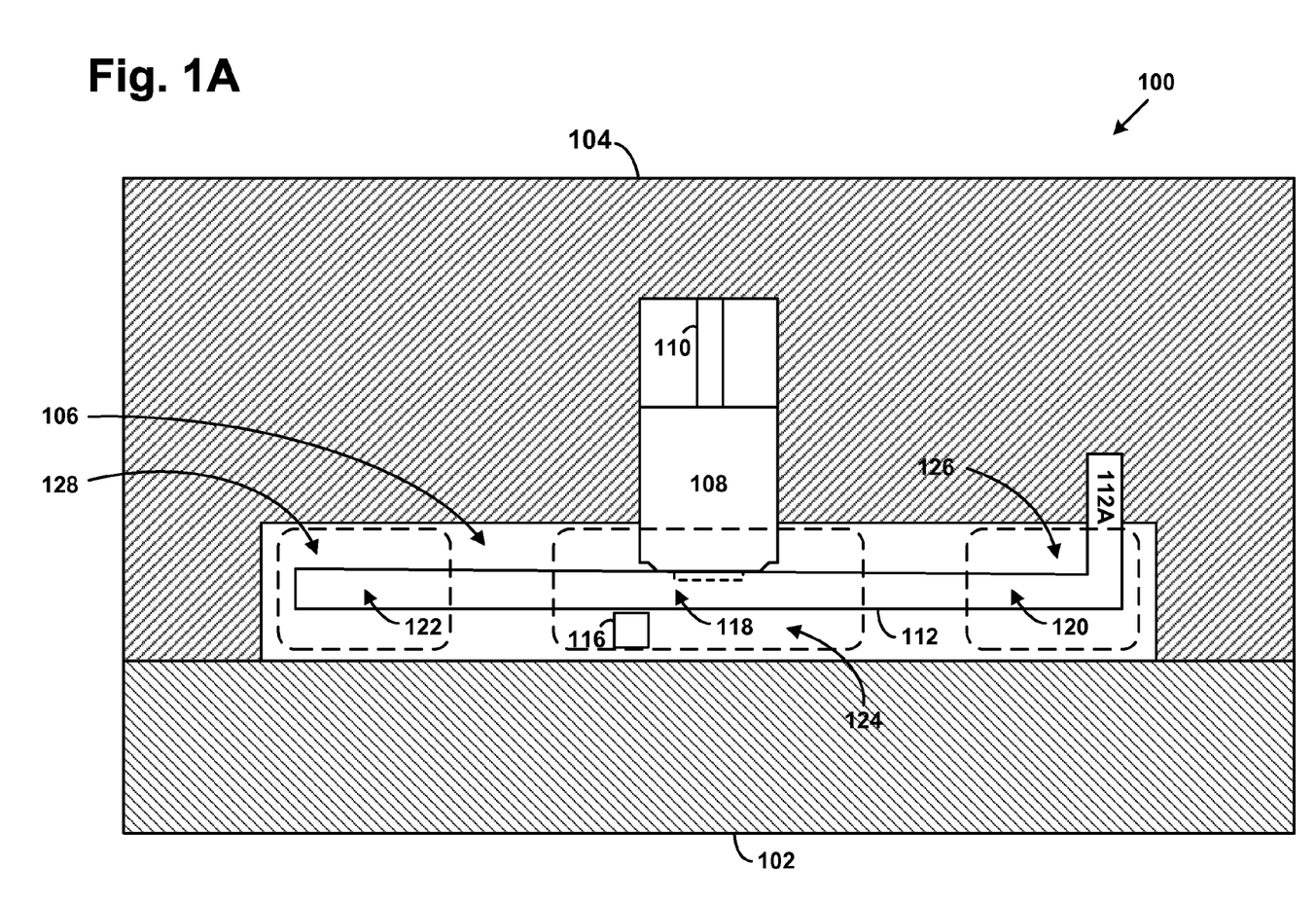
FIG. 1A is a block diagram illustrating a cross-section of an exemplary injection-molding system.
Figure 1B:
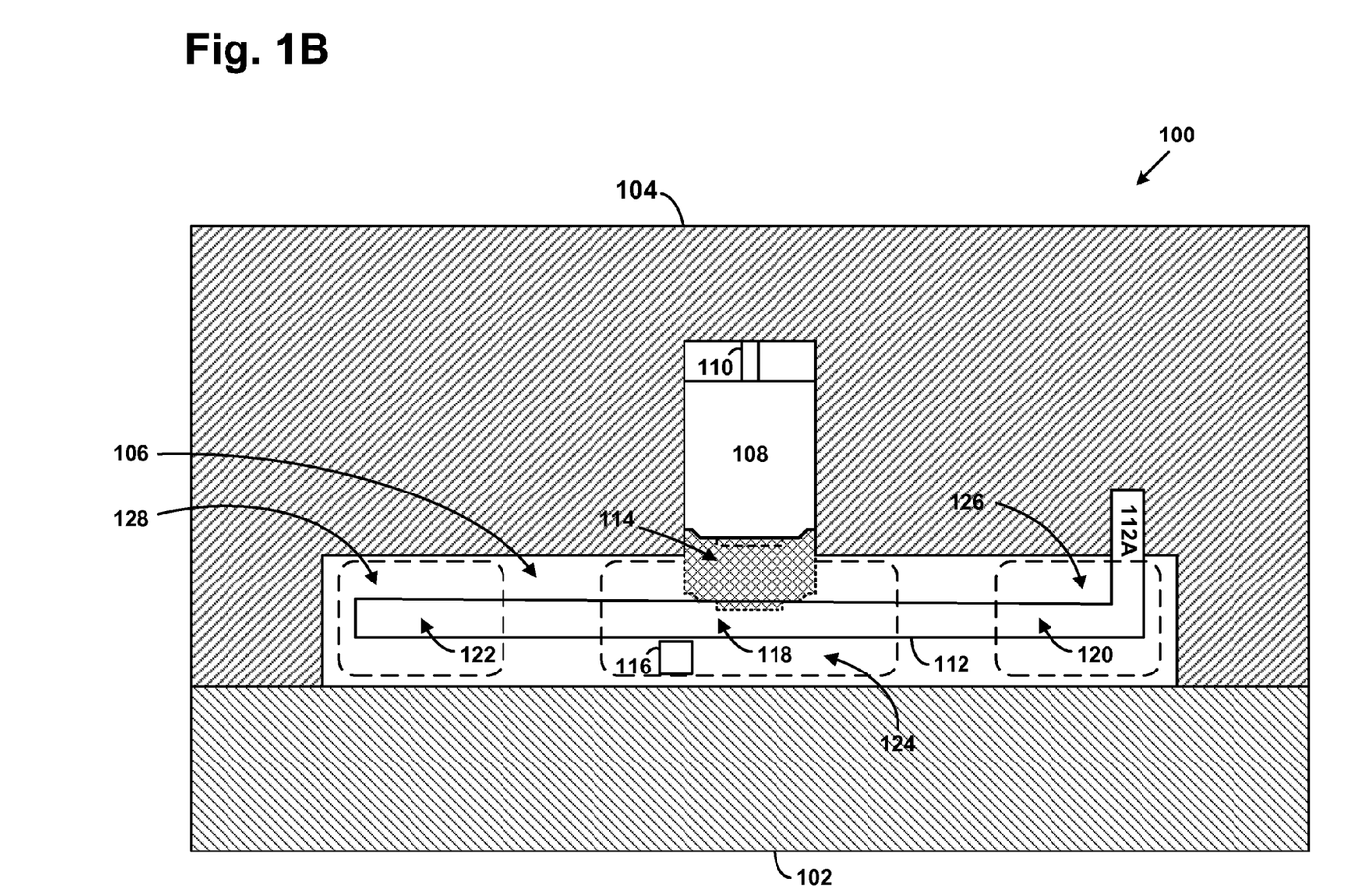
FIG. 1B is another block diagram illustrating a cross-section of an exemplary injection-molding system.

FIGS. 1A and 1B are block diagrams illustrating a cross-section of an exemplary injection-molding system 100. The injection-molding system 100 includes a first mold plate 102 and second mold plate 104, the opposing inner surfaces of which define a mold cavity 106. As shown, the second mold plate 104 includes a retractable core 108. The retractable core 108 is movable vertically via a feature 110, which may take any appropriate form. For example, feature 110 may be pneumatic, hydraulic, or spring-loaded feature, among others, which functions to extend and to retract, or to allow retraction of, the retractable core 108. Further, in an alternative embodiment, it is possible that the retractable core may be configured to extend and retract horizontally, or in any other direction.

Preferably, the retractable core 108 is extendable to hold at least one insert 112 at a desired location within the mold cavity 106. For example, FIG. 1A shows the retractable core 108 in an extended position, in which the retractable core 108 contacts the insert 112, in order to hold the insert 112 in place. Further, the retractable core 108 can preferably be retracted, which moves the retractable core 108 away from the insert 112, and thus opens additional cavity space between the insert 112 and the retractable core 108. For example, FIG. 1B shows retractable core 108 in a retracted position, which has created additional cavity space 114 between the insert 112 and retractable core 108.

Note that because the side surfaces of retractable core 108 are substantially flush to the opposing side surfaces of the second mold plate 104, and thus prevent molten plastic from flowing between the retractable core 108 and the second mold plate 104, the surfaces of retractable core 108 that are exposed to the cavity 106 define a portion of the cavity 106. Accordingly, for the sake of simplicity, references herein to the inner surface of the second mold plate 104, which together with the inner surface of the first mold plate 102 defines the mold cavity 106, should be understood to include the surface(s) of the retractable core 108 that are exposed to the mold cavity 106.

Figure 1C:
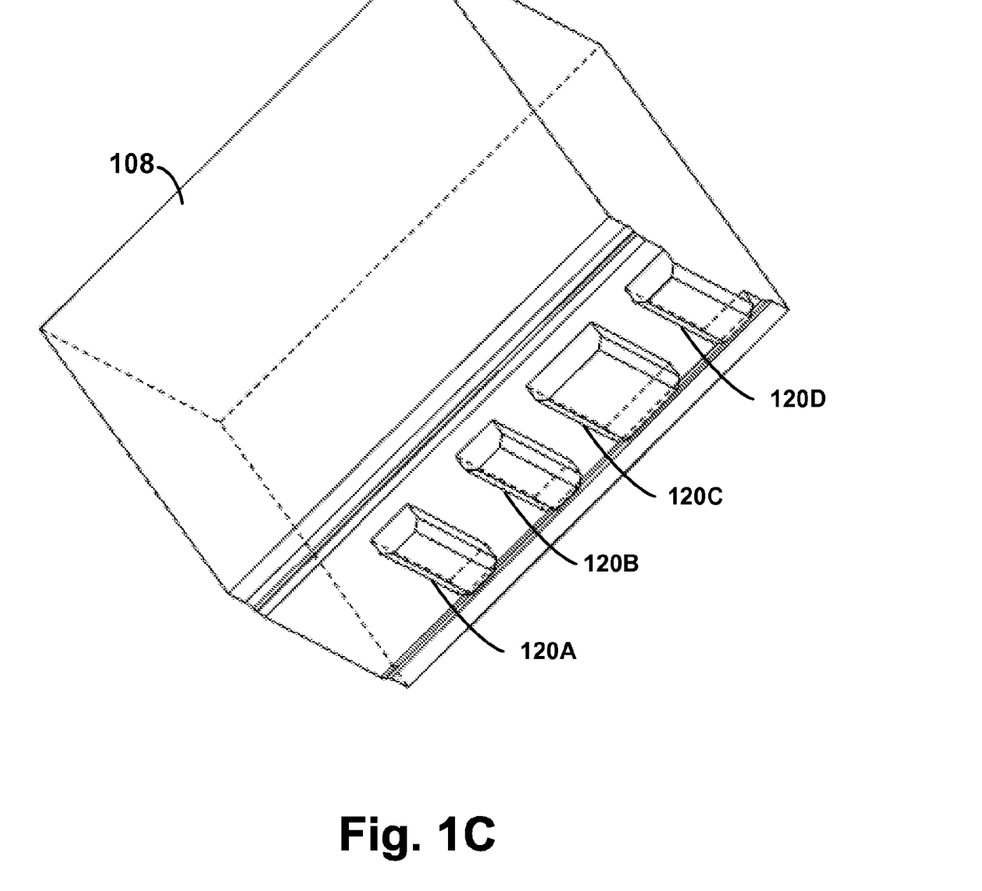
FIG. 1C is a three-dimensional view of a retractable core that includes protrusions, according to an exemplary embodiment.

In a further aspect, when retractable core 108 is extended, it preferably holds the insert(s) 112 in place with protrusions that extend from retractable core 108 and substantially prevent horizontal movement of the inserts within the cavity. For example, FIG. 1C is a three-dimensional view of an exemplary retractable core 108, which includes protrusions 120A-120D. When retractable core 108 is extended into the mold cavity, inserts may be located between the protrusions 120A-120D. As such, the protrusions on either side of an insert 112 prevent substantial horizontal movement by the insert. However, the molten plastic being injected under insert 112 may also exert a significant upward force on the insert 112. In a further aspect of retractable core 108, the bottom surface of retractable core 108 may prevent undesirable movement of insert 112 in the vertical direction (e.g., undesirable movement of the insert 112 such that it would be exposed to the exterior of the final molded part, potentially causing the product to be rejected).

Further, while the cross-section shown in FIGS. 1A and 1B shows only one insert 112, a preferred embodiment includes a plurality of inserts that are oriented substantially parallel to each other. For example, in a preferred embodiment, retractable core 108 may include protrusions 120A-120D which function to hold three to four electrical inserts substantially parallel to each other within the mold cavity 106. Generally, it should be understood that references to embodiments that involve multiple inserts may apply equally to embodiments that involve a single insert, and vice versa.

In the illustrated embodiment shown in FIGS. 1A and 1B, the insert 112 optionally extends out of the mold cavity 106, and into the second mold plate 104, as shown by optional section 112A of insert 112. For example, section 112A may extend into a recessed feature of second mold plate 104 that functions to secure the section 112A against substantial movement. This securement may be accomplished, for example, by means of a friction fit or other mechanical means such as clamping. When the inserts are electrical, for example, this arrangement produces a product having one or more electrical terminals that are exposed, since section 112A is not encapsulated during the injection-molding process. Further, since section 112A of the insert 112 extends into the second mold plate 104, this may function to prevent substantial movement of the insert 112 prior to the injection process. During the injection process, and depending on its length, the insert 112 may, if unsupported, flex when subject to the injection pressure of the molten plastic. However, with the retractable core 108, insert 112 can be held in a desired position within the mold cavity 106, as movement of the insert 112 is controlled by the extension of insert 112 into the second mold plate 104 in combination with contact with retractable core 108. In a further aspect, an exemplary injection-molding system 100 may include a runner (not shown) with a gate 116 located in close proximity to retractable core 108. Gate 116 allows molten plastic to be injected into the mold cavity 106. As molten plastic is injected, already-injected plastic is forced away from gate 116 towards the ends of the mold cavity 106 and into a second cavity space 126 and/or a second cavity space 128. As the molten plastic fills second cavity spaces 126 and/or 128, the molten plastic encapsulates distal portions 122 and 120, respectively, of the insert 112. As a result, the ends of the mold cavity 106, which are further from the retractable core 108, are filled with plastic before the center of the mold cavity 106, which is beneath and/or around the retractable core 108. Accordingly, first cavity space 124, which includes the location through which the gate 116 enters the cavity space 106, is substantially filled with molten plastic (except for any volume occupied by the extended retractable core 108 in FIG. 1A), and the molten plastic encapsulates exposed surfaces of a proximal portion 118 of the insert 112, subsequent to the second cavity spaces 126 and/or 128 being substantially filled. Further, because new molten plastic is constantly being injected through gate 116 into the center of the mold cavity 106, the plastic filling the ends of the mold cavity 106 (e.g., second cavity spaces 126 and/or 128) begins to cool and harden before the plastic filling the center of the mold cavity 106 (e.g., first cavity space 124).

In order to produce a plastic product without knit lines, and in which the inserts are positioned as desired, an exemplary injection-molding system 100 is preferably configured to retract the retractable core 108 at a point during injection when the plastic filling the ends of the mold cavity 106 (e.g., second cavity spaces 126 and/or 128) has substantially cooled, but the plastic filling the center of the mold cavity 106 (e.g., first cavity space 124) is still substantially heated. At this point, the cooled plastic at the ends of the mold cavity 106 preferably has hardened to the point that it is capable of holding the insert 112 in place. With the cooled plastic in the ends of the mold cavity 106 securing the insert 112, retractable core 108 no longer needs to be extended to hold the insert 112, and may accordingly be retracted.

Because the ends of mold cavity 106 are already substantially filled when the retractable core 108 is retracted, the molten plastic that continues to be injected through gate 116 primarily fills the central portion of the mold cavity 106 (e.g., first cavity space 124), which now includes the newly opened cavity space 114. Importantly, since retractable core 108 is retracted during the time period that the plastic that is in close proximity to the retractable core (i.e., the plastic filling the center of mold cavity 106) is still substantially heated, a secure bond forms between the plastic injected before retractable core 108 is refracted and plastic injected during and after the retraction of retractable core 108. This secure bond substantially eliminates knit lines and therefore produces a stronger and more resilient plastic product with embedded inserts.

Note that in FIGS. 1A and 1B, the gate 116 is not part of the illustrated cross-sectional plane, but rather is located on the far side of the cavity, and thus visible through the cavity space of mold cavity 106. However, without departing from the scope of the invention, it should be understood that the gate 116 may be located elsewhere on the cavity 106, so long as the gate 116 is located within close proximity of the retractable core 108.

In an exemplary embodiment, a gate that is located within four millimeters from a retractable core having a width of ten millimeters in a cavity space with a total volume of approximately 2 to 2.5 cm$^3$ may be considered to be in "close proximity" to the retractable core. Further, in an exemplary embodiment, gate 116 is located below insert 112, such that when molten plastic is injected, it exerts an upward force on the insert, causing the insert 112 to contact the retractable core 108, when the retractable core 108 is in an extended position. However, the distance between the gate and retractable core that is considered to be within close proximity may vary as a matter of engineering design choice, depending upon the size of the cavity, the size of the retractable core, the type of liquid plastic being injected, etc., so long as the gate is located such that the plastic filling the ends of the mold cavity 106 (e.g., second cavity spaces 126 and/or 128) begins to cool and harden before the plastic filling the center of the mold cavity 106, and thus serves to hold the insert 112 when the retractable core is retracted.

If the plastic at the ends of the mold cavity 106 did not hold insert 112 in place, then it would be possible that after retractable core 108 is retracted, the insert 112 could move due to the high pressure of the inflowing molten plastic, and possibly come in contact with each other. In the case of multiple electrical inserts, this could create a short circuit that would cause the product to be rejected. Further, there is a pressure differential created when retractable core 108 is retracted, as the molten below the insert 112 exerts a greater force on the inserts than the air or vacuum space above the inserts in the newly created additional cavity space 114. As a result, if the plastic at the ends of the mold cavity 106 did not hold the insert 112 in place, then undesirable upward movement might result from the pressure differential during the continuous injection process.

Herein, references to "electrical inserts" (which may be referred to interchangeably as "electrically-conductive inserts") include inserts composed of any electrically-conductive material. Accordingly, since the retractable core 108 contacts an electrically-conductive insert in order to hold the insert in the desired position, holding the insert in the desired position involves the retractable core contacting electrically conductive material. As such, at the instant the retraction of the core begins, and before the additional cavity space 114 is filled, the portion of the electrically-conductive insert that was contacted by the retractable core 108 may be exposed to air (or vacuum space) in the mold cavity 106. However, because the additional cavity space 114 is eventually filled while the nearby already-injected plastic is still substantially heated, the insert 112 is encapsulated within the plastic product, without substantial knit lines that could compromise the insulation of the insert (e.g., by allowing exterior moisture to penetrate into the interior of the finished plastic product through knit lines).

References herein to a cavity space that is near or in close proximity to the retractable core 108 should be understood to include a cavity space that fills with molten plastic that remains substantially heated after molten plastic further from the retractable core has substantially set (i.e., substantially cooled and hardened enough to secure the inserts from movement). First cavity space 124 is an example of such a cavity space; however, such a cavity space may be larger or smaller than first cavity space 124, and may configured differently or may exhibit a different shape. Similarly, references herein to cavity space "further" from the retractable core should be understood to include cavity space that substantially fills before cavity space near the retractable core 108, and thus substantially sets earlier in the injection process. Second cavity spaces 126 and/or 128 are examples of such cavity spaces; however, such cavity spaces may be larger or smaller than second cavity spaces 128, and may configured differently or may exhibit different shapes.

In a variation on the embodiment of FIGS. 1A and 1B, the insert or inserts may not extend into the mold plate via optional portion 112A, and thus vertical support for the inserts may be provided in another manner. For example, one or more retractable pins (not shown) may be included in the first mold plate 102. The retractable pins may apply a force on the insert 112 and in opposition to the retractable core 108, and the pins may be retracted in a similar manner to retractable core 108. As another example, an opposing retractable core may be included in the first mold plate 102. The opposing retractable core may apply a holding force on the insert 112 and in opposition to the retractable core 108, and the opposing core may be retracted in a similar manner as retractable core 108 (and preferably simultaneously with retractable core 108). Other variations are also possible.

Furthermore, it should be understood that FIGS. 1A and 1B are simplified block diagrams and do not represent an entire injection molding system, but only a portion thereof. As such, other embodiments may have mold cavities of varying form, and may include other movable and non-movable features and parts in addition to the features and parts shown in FIGS. 1A and 1B.

Figure 2:
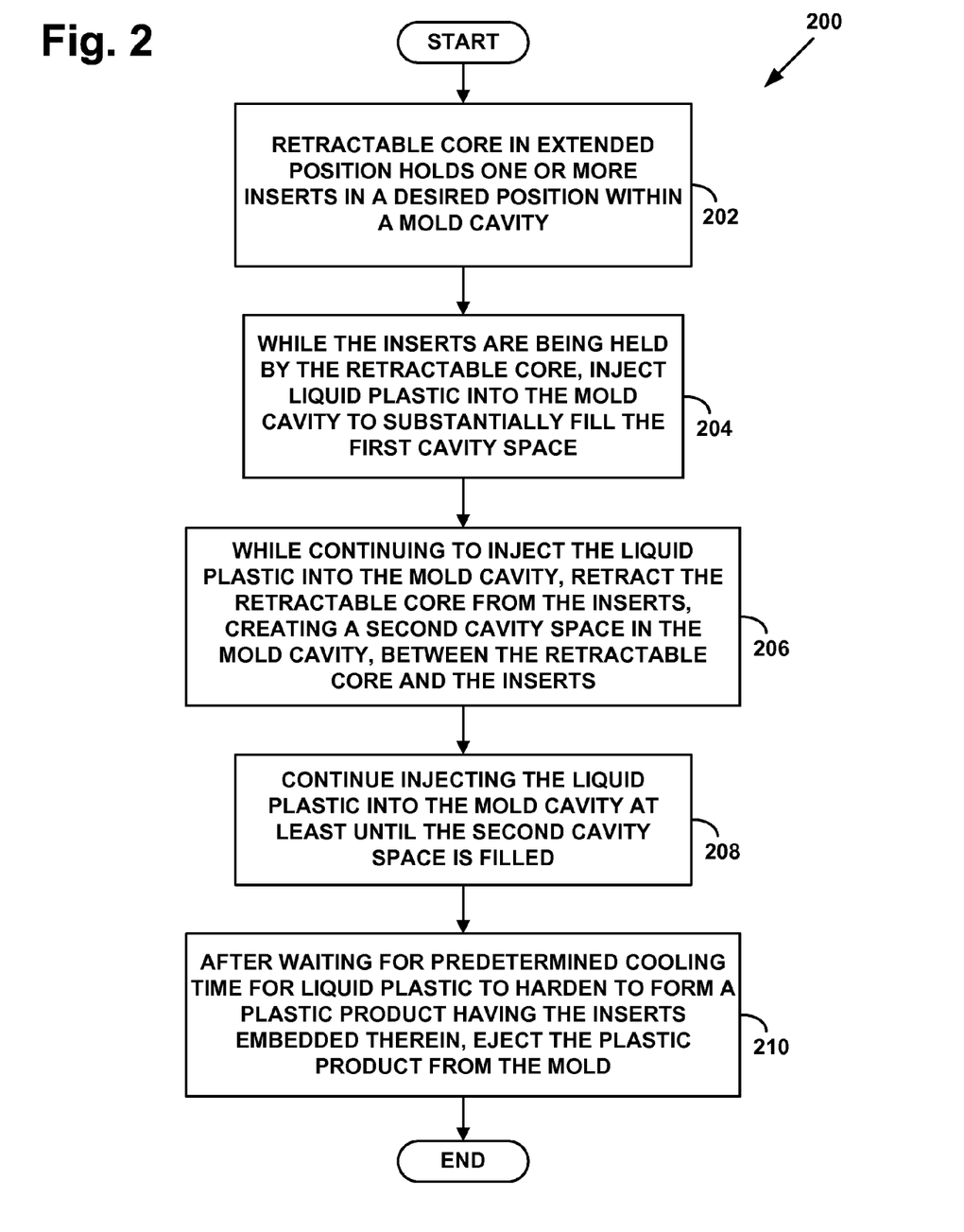
FIG. 2 is a flow chart illustrating an injection molding process, according to an exemplary embodiment.

FIG. 2 is a flow chart illustrating an injection molding process 200 according to an exemplary embodiment. The method may be implemented using a mold having a retractable core, such as that shown in FIGS. 1A and 1B. As shown, process 200 involves a retractable core in an extended position holding one or more inserts in a desired position within a mold cavity, as shown by block 202. Then, while the one or more inserts are being held in place by the retractable core, molten plastic is injected into the mold cavity to substantially fill the first cavity space, as shown by block 204. While continuing to inject the molten plastic into the cavity of the mold, the retractable core is retracted from contacting the one or more inserts, creating a second cavity space of the mold cavity, between the retractable core and the inserts (e.g., cavity space 114 of FIG. 1B), as shown by block 206. The injection of molten plastic then continues into the mold cavity at least until the second cavity space is filled, as shown by block 208. Then after waiting a predetermined cooling time for the molten plastic to harden to form a plastic product having the one or more inserts embedded therein, the plastic product is ejected from the mold, as shown by block 210.

In an exemplary embodiment, a gate is located in close proximity to the retractable core, and the retractable core is retracted at a predetermined time before already-injected molten plastic near the retractable core substantially cools and hardens. By timing the retraction as such, the molten plastic is injected to fill the additional volume between the retractable core and the inserts before the already-injected molten plastic near the retractable core substantially cools, which helps prevent knit lines from forming. Further, retraction of the retractable core may be timed such that the already-injected plastic further from the core has cooled and hardened. As such, the hardened plastic further from the core holds the inserts in place after the retractable core is retracted, allowing for continuous injection near the core, without risking the inserts being moved in an undesired manner by the flow of the newly-injected molten plastic.

Referring back to FIG. 1, an exemplary injection-molding system may further include a control system that is configured to control the operation of the mold plates 102 and 104, the injection of molten plastic via gate 116, and various other functions of an exemplary system. For example, the control system may take the form of an automated computer system that causes the injection molding system to carry out an injection molding process, such as process 200 of FIG. 2.

Figure 3A:
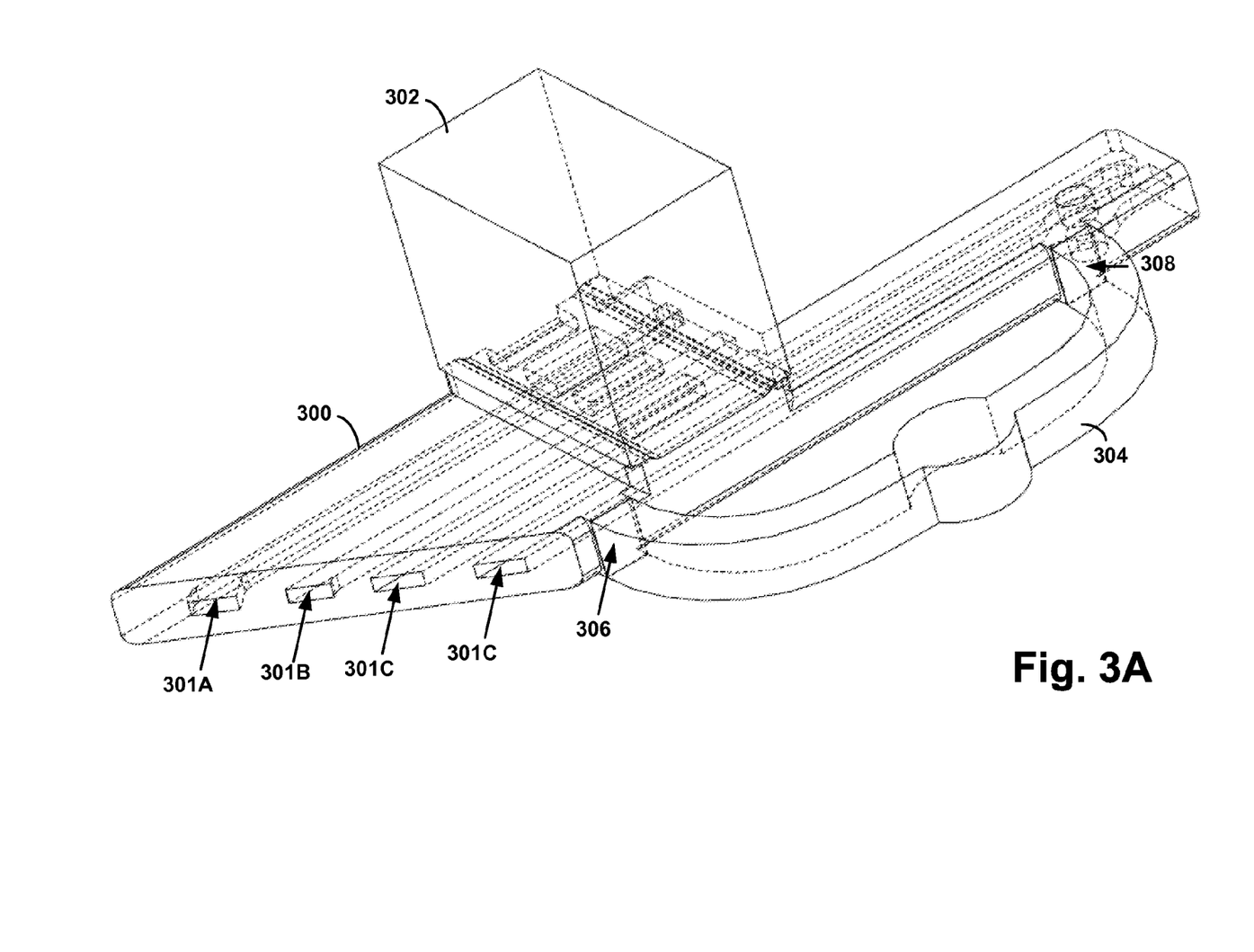
FIG. 3A is a three-dimensional view of a section of a plastic product, which may be produced using an exemplary injection molding process.

FIG. 3A is a three-dimensional view of a section of a plastic product 300, which is produced using an exemplary injection molding process, such as process 200 of FIG. 2. Embedded in the plastic product 300 are four electrical inserts 301A-301D, which in the illustrated section, are completely insulated by the surrounding plastic. For simplicity, FIG. 3 does not show the mold plates used to define the mold cavity that gives the plastic product 300 its shape (e.g., plates 102 and 104 of FIG. 1). However, FIG. 3 shows the retractable core 302, which operates in conjunction with a mold plate in a similar manner as described in reference to FIG. 1. Also shown is a runner 304, which includes a gate 306 near the retractable core 302, as well as another gate 308 further from the retractable core 302. As shown, retractable core 302 is in a retracted position, and thus plastic has been injected between retractable core 302 and electrical inserts 301A-301D.

Figure 3B:
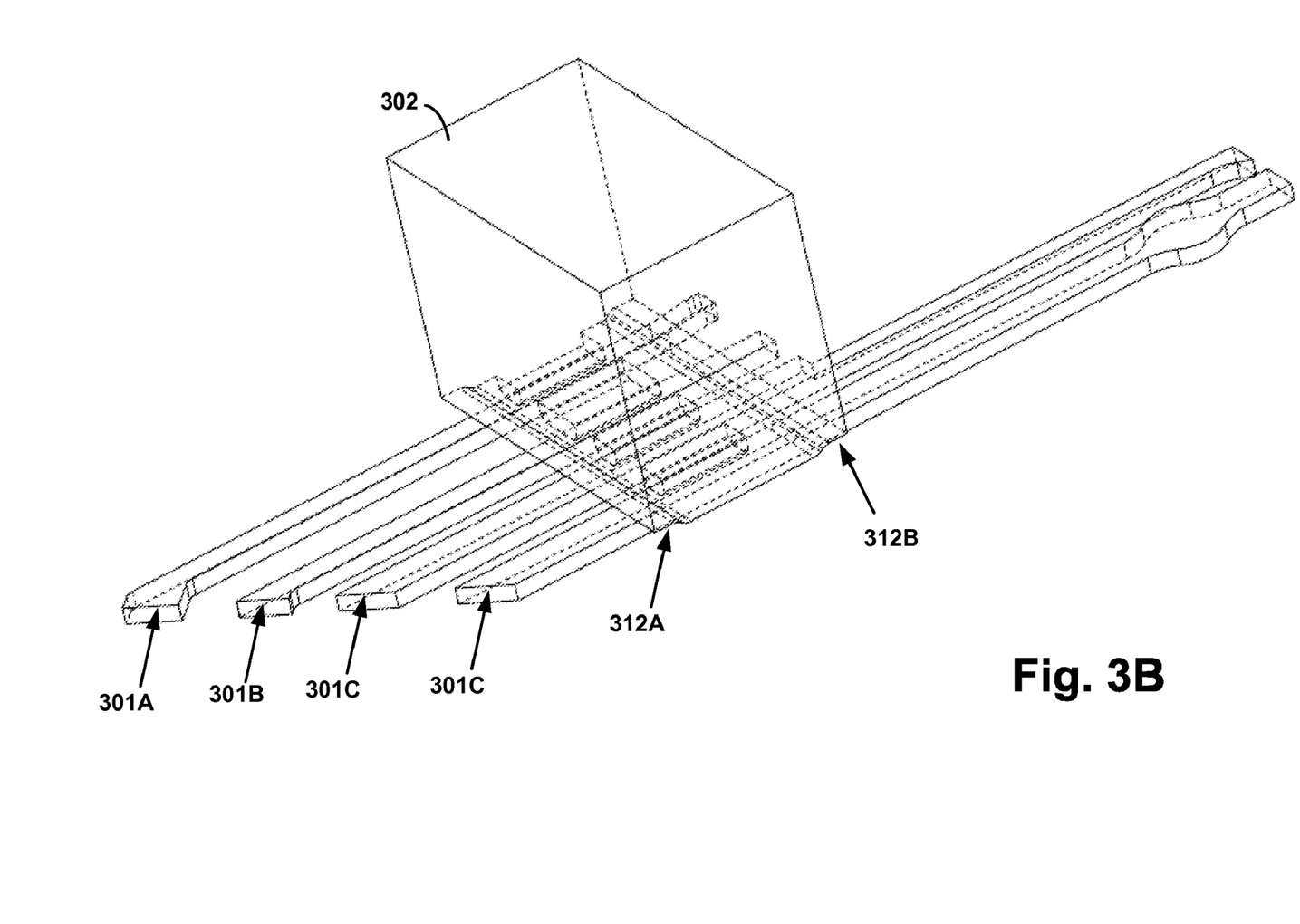
FIG. 3B is a three-dimensional view of electrical inserts and a retractable core, according to an exemplary pre-injection arrangement.

FIG. 3B is a three-dimensional view of the electrical inserts 301A-301D and the retractable core 302 in an exemplary pre-injection arrangement. In particular, retractable core 302 is in an extended position in order to hold the electrical inserts 301A-301D in the desired position within the mold cavity, before and during the initial portion of an exemplary injection-molding process.

Figure 3C:
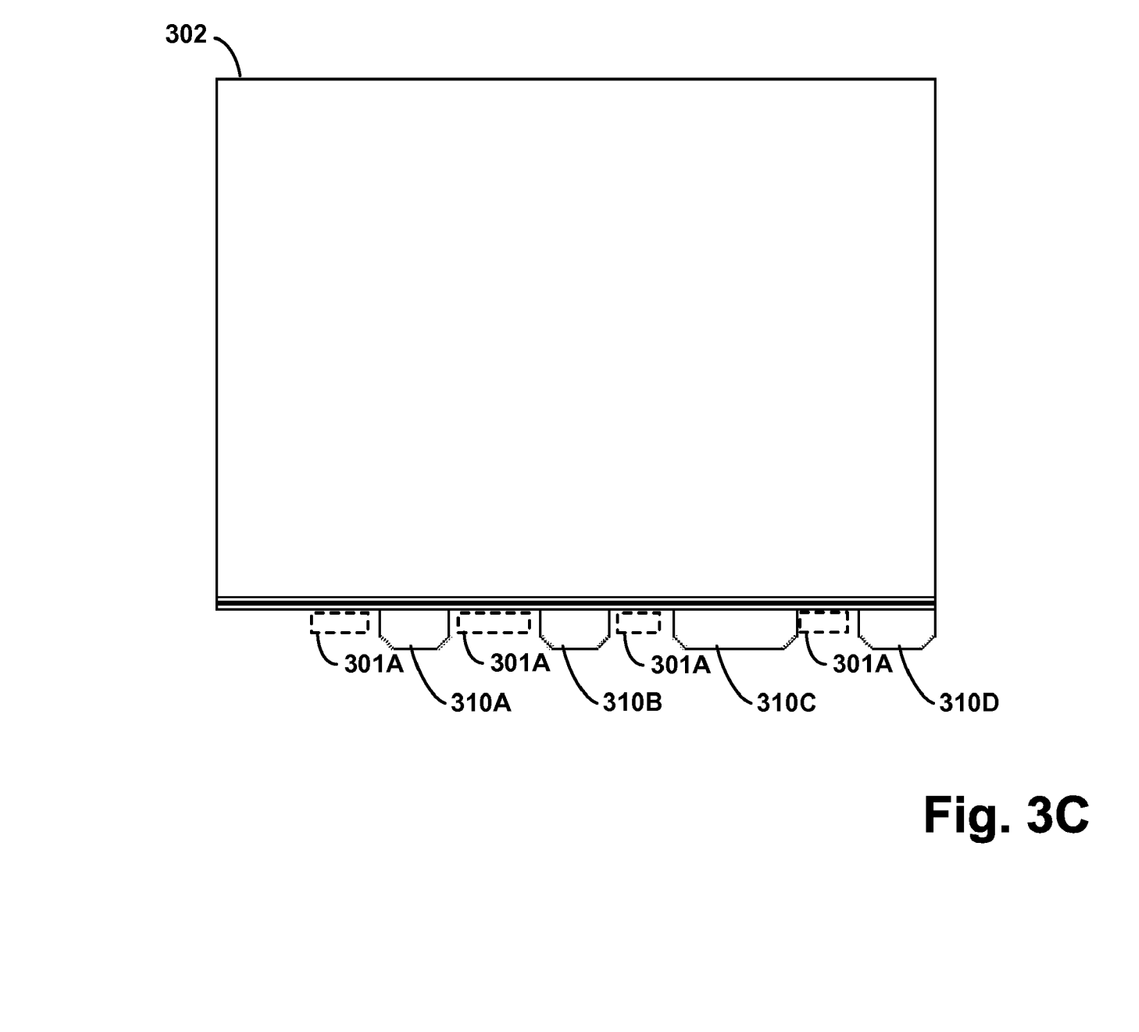
FIG. 3C is a cross-sectional view of a retractable core and electrical inserts, when the retractable core is in an extended position, according to an exemplary embodiment.
Figure 3D:
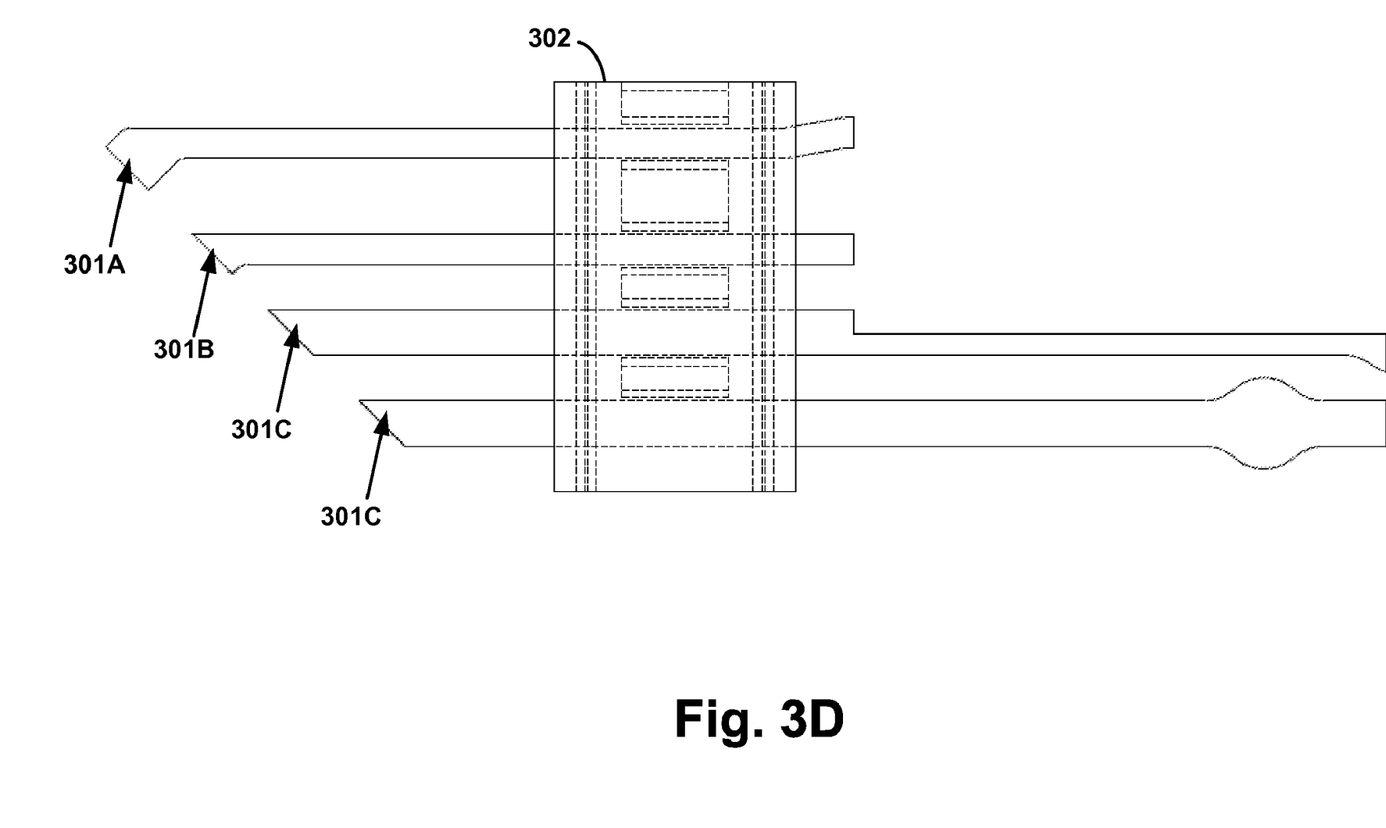
FIG. 3D is a block diagram illustrating the lower surface of a retractable core in an extended position; according to an exemplary embodiment.

As shown in more detail in FIGS. 3C and 3D, the retractable core 302 includes four protrusions 310A-310D configured to substantially secure electrical inserts 301A-301D from movement in a vertical (upward) direction and from movement in a horizontal (lateral) direction. FIG. 3C is a cross-sectional view of retractable core 302 and electrical inserts 301A-301D when retractable core 302 is in an extended position. FIG. 3D is a block diagram illustrating the lower surface of retractable core 302 in an extended position. As shown, the electrical inserts 301A-301D sit between the protrusions 310A-310D, and thus the protrusions 310A-310D prevent substantial horizontal movement by the inserts. In such an embodiment, the retractable core 302 with protrusions 310A-310D may also be referred to as a retractable "comb" feature. Importantly, the protrusions 310A-310D of the comb feature prevent the electrical inserts 301A-301D from coming into contact with each other during the injection-molding process. If the electrical inserts 301A-301D were to contact one-another, this could create a short circuit and cause the final product to be rejected.

Note that in the illustrated embodiment of retractable core 302, there are only four protrusions 310A-310D for the four inserts 301A-301D. This arrangement is sufficient in many cases, where some deviation in the position of the electrical inserts within the plastic product is permissible, so long as the electrical inserts do not contact each other, and are insulated by the surrounding plastic. For example, since electrical insert 301A is only adjacent to one protrusion 310A, it is possible that electrical insert 301A may move horizontally to some extent. However, the horizontal movement is away from the other electrical inserts 301B-301D. Additionally, there may be a small gap between the sides of electrical inserts 301A-301D and the respective adjacent protrusions 310A-310D, which allows for slight horizontal movement. This again is acceptable as the protrusions 310A-310D keep the electrical inserts 301A-301D in a general position where the inserts cannot contact each other. In alternative embodiments, it is of course possible that a comb feature may include protrusions on both sides of every insert. This would be necessary, for example, when an insert is located very near an external surface of the final molded part and could potentially protrude from the final part in an undesirable manner. It is also possible that the dimensions of the protrusions are such that when the comb feature is extended, there is no gap between the inserts and their corresponding protrusions.

In a further aspect, the comb feature of retractable core 302 preferably includes smooth curves 312A and 312B on both edges. When the retractable core 302 is initially retracted, the smooth curves 312A and 312B each create a ramped flow front that may further facilitate proper bonding between newly injected plastic in the cavity space opened by retraction of the retractable core and already-injected plastic near the core. For example, referring back to FIG. 1B, when retractable core 108 is retracted, all of mold cavity 106 except for additional cavity space 114 may be substantially filled with plastic. Accordingly, the flow front of the already-injected liquid in mold cavity 106 may be ramped near the edges of the retractable core, mirroring the curvature (or angle) of the edges of the retractable core 10, (i.e. the flow front of the already-injected plastic and the newly-injected plastic may meet near the illustrated boundaries of additional cavity space 114).

It should be understood the arrangements and functions described herein are presented for purposes of example only, and that numerous variations are possible. For instance, elements of an exemplary injection-molding process can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. An injection molding process comprising:
   (a) positioning a retractable core within a mold cavity to hold two or more electrically conductive inserts in a desired position within the mold cavity, wherein the retractable core comprises a portion in the mold cavity that separates the two or more inserts in the mold cavity and prevents the two or more inserts from contacting each other during an injection of hot molten plastic into the mold cavity, wherein the retractable core is configured to restrict movement of a proximal portion of each of the two or more inserts in at least one horizontal direction and one vertical direction, further wherein the mold cavity is defined by a first mold plate and a second mold plate and the retractable core is a feature of the second mold plate;

(b) while the two or more inserts are being held in the desired position by the retractable core, initiating the injection of hot molten plastic into the mold cavity through at least one gate located in close proximity to the retractable core, wherein the injected plastic: (i) substantially fills a first cavity space encompassing the gate and the proximal portion of each of the two or more inserts, and (ii) substantially fills a second cavity space encompassing a distal portion of each of the two or more inserts and located beyond the first cavity space in relation to the gate;

(c) continuing the injection of hot molten plastic into the mold cavity, and at such time that the injected plastic in the second cavity space has cooled and hardened sufficiently to substantially secure the distal portion of each of the two or more inserts from movement and the injected plastic in the first cavity space is still sufficiently warm and molten to securely bond to newly injected hot molten plastic, retracting the retractable core from its position restricting the movement of a proximal portion of each of the two or more inserts, wherein retracting the retractable core creates an additional cavity space within the mold cavity between the retractable core and the two or more inserts; and (d) continuing the injection of hot molten plastic into the mold cavity until the mold cavity, including the additional cavity space, is filled.

2. The process of claim 1, wherein the first cavity space is substantially filled subsequent to the second cavity space being substantially filled.

3. The process of claim 1, wherein positioning the retractable core comprises positioning protrusions from the retractable core on opposing sides of at least one of the two or more inserts.

4. The process of claim 1, wherein the retractable core comprises a comb feature that is used to hold the two or more inserts in the desired position within the mold cavity, and wherein the comb feature includes a smooth curve on at least one edge of the retractable core, wherein the smooth curve creates a ramped flow front when the retractable core is initially retracted.

5. The process of claim 1, further comprising contacting a retractable feature of the first mold plate to the proximal portion of at least one of the two or more inserts, wherein the retractable feature of the first mold plate opposes the retractable core.

6. The process of claim 5, wherein the retractable feature of the first mold plate comprises one of: a second retractable core or a retractable pin.

7. An injection molding process comprising:

(a) positioning a retractable core within a mold cavity to hold two or more electrically conductive inserts in a desired position within the mold cavity, wherein the retractable core comprises a portion in the mold cavity that separates the two or more inserts in the mold cavity and prevents the two or more inserts from contacting each other during an injection of hot molten plastic into the mold cavity, wherein the retractable core is configured to restrict the movement of a proximal portion of each of the two or more inserts in at least one horizontal direction and one vertical direction, further wherein the mold cavity is defined by a first mold plate and a second mold plate and the retractable core is a feature of the second mold plate;

(b) securing a distal portion of each of the two or more inserts within a mold cavity feature, such that the distal portion of each of the two or more inserts is restricted from movement;

(b) while the two or more inserts are being held in the desired position by the retractable core and the mold cavity feature, initiating the injection of hot molten plastic into the mold cavity through at least one gate, wherein the injected plastic substantially fills the mold cavity, including a first cavity space encompassing the gate and the proximal portion of each of the two or more inserts;

(c) continuing the injection of hot molten plastic into the mold cavity, and within such time that the injected plastic in the first cavity space is still sufficiently warm and molten to securely bond to newly injected hot molten plastic, retracting the retractable core from its position restricting the movement of a proximal portion of each of the two or more inserts, wherein retracting the retractable core creates an additional cavity space within the mold cavity between the retractable core and the two or more inserts; and (d) continuing the injection of hot molten plastic into the mold cavity until the mold cavity, including the additional cavity space, is filled.

8. The process of claim 7, wherein positioning the retractable core comprises positioning protrusions from the retractable core on opposing sides of at least one of the two or more inserts.

9. The process of claim 7, wherein the retractable core comprises a comb feature that is used to hold the two or more inserts in the desired position within the mold cavity.

10. The process of claim 7, further comprising contacting a retractable feature of the first mold plate to the proximal portion of at least one of the two or more inserts, wherein the retractable feature of the second mold plate opposes the retractable core.

11. The process of claim 10, wherein the retractable feature of the first mold plate comprises one of: a second retractable core or a retractable pin.

12. An injection-molding system comprising:

(a) a first mold plate having an inner surface defining a first portion of a mold cavity;

(b) a second mold plate having an inner surface defining a second portion of the mold cavity, wherein the first mold plate mates to the second mold plate to define the mold cavity, wherein the second mold plate comprises a retractable core, wherein the retractable core is extendable from the inner surface of the second mold plate to hold two or more electrically conductive inserts in a desired position within the mold cavity, wherein the retractable core comprises a portion in the mold cavity that separates the two or more inserts in the mold cavity and prevents the two or more inserts from contacting each other during an injection of hot molten plastic into the mold cavity, and wherein the retractable core is retractable, during a continuous injection of molten plastic, to create additional cavity space within the mold cavity between the retractable core and the two or more inserts; and (c) a runner having a gate located in close proximity to the retractable core, such that plastic filling a second cavity space further from the retractable core in the mold cavity will cool and harden while plastic filling a first cavity space within the mold cavity in close proximity to the retractable core remains substantially heated.

13. The injection-molding system of claim 12, wherein the retractable core is configured to be retracted away from the two or more inserts during the injection of molten plastic into the cavity when (i) already-injected plastic further from the retractable core in the mold cavity has substantially cooled and (ii) already-injected plastic near the retractable core in the mold cavity has not substantially cooled, such that the substantially-cooled plastic further from the retractable core holds the two or more inserts in the desired location after retracting the retractable core, and such that molten plastic injected into the additional cavity space between the retractable core and the inserts securely bonds to already-injected plastic near the retractable core in the mold cavity.

14. The injection-molding system of claim 12, wherein the retractable core comprises a plurality of protrusions that are positioned on opposing sides of at least one of the two or more inserts to hold the at least one of the two or more inserts in the desired position.

15. The injection-molding system of claim 12, wherein a portion of each of the two or more inserts extends into one of the mold plates to assist the retractable core in holding the two or more inserts in the desired position within the mold cavity.

16. The injection-molding system of claim 12, wherein the first mold plate comprises a retractable feature that opposes the retractable core.

17. The injection-molding system of claim 16, wherein the retractable feature that opposes the retractable core comprises one of: (a) a second retractable core and (b) one or more retractable pin features.

* * * * *